US011662597B2

(12) United States Patent
Bartlett

(10) Patent No.: US 11,662,597 B2
(45) Date of Patent: May 30, 2023

(54) HOMOGENIZING LENS ARRAY FOR DISPLAY IMAGING

(71) Applicant: Texas Instruments Incorporated, Dallas, TX (US)

(72) Inventor: Terry Alan Bartlett, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 858 days.

(21) Appl. No.: 16/503,412

(22) Filed: Jul. 3, 2019

(65) Prior Publication Data

US 2021/0003854 A1 Jan. 7, 2021

(51) Int. Cl.
*G02B 27/42* (2006.01)
*G03B 21/20* (2006.01)
*G02B 5/32* (2006.01)

(52) U.S. Cl.
CPC .......... *G02B 27/4205* (2013.01); *G02B 5/32* (2013.01); *G03B 21/208* (2013.01); *G03B 21/2013* (2013.01); *G03B 21/2033* (2013.01); *G03B 21/2053* (2013.01)

(58) Field of Classification Search
CPC ...... G02B 27/42; G02B 27/4205; G02B 5/32; G02B 27/10; G02B 27/141; G02B 6/0016; G02B 3/0056; G03B 21/2013; G03B 21/2033; G03B 21/00; G03B 21/20; G03B 21/2053; G03B 21/208; G03B 27/42; G02F 10/01; G02F 1/33; G02F 1/03; G02F 1/0105

USPC ......... 359/15, 279, 238, 310, 316, 242, 245, 359/237, 558, 563, 618, 621

See application file for complete search history.

(56) References Cited

U.S. PATENT DOCUMENTS 6,577,429 B1 * 6/2003 Kurtz .................. G02B 27/48
348/E9.026
9,848,176 B2 12/2017 Damberg et al.

OTHER PUBLICATIONS

Damberg; et al.; "Light Steering Projection Systems and Attributes for HDR Displays"; Department of Computer Science, University of British Columbia, Vancouver, Canada; Invited Paper; 2017; ISSN 0097-996X17/4701-0087; pp. 87-90.

* cited by examiner

*Primary Examiner* — Jie Lei
(74) *Attorney, Agent, or Firm* — Michelle F. Murray; Frank D. Cimino

(57) ABSTRACT

In described examples, a system (e.g., a projection system) can include a diffractive optical element adapted to be illuminated by at least one coherent light beam. A lens array is coupled to receive a diffracted beam of light from the diffractive optical element. The lens array includes a first and a second array lens. The first array lens is coupled to receive a first sector of a pattern of illumination of the diffracted beam of light, and the second array lens is coupled to receive a second sector of the pattern of illumination of the diffracted beam of light. A spatial light modulator is coupled to receive overlapping diffracted beams of light from the first and second array lenses to form an image beam.

20 Claims, 4 Drawing Sheets

HOMOGENIZING LENS ARRAY FOR DISPLAY IMAGING

BACKGROUND

Projection systems can include devices such as spatial light modulators (SLMs). The SLMs can modulate light (including beam-steered light) for projection on a display surface. Some SLMs are arranged as digital micromirror devices (DMDs) having tiltable micromirrors. To project an illuminated pixel, a corresponding micromirror is tilted in a first direction, so that light is reflected toward a display surface. When the pixel is not to be illuminated, the corresponding micromirror is tilted in a second direction, so that light is reflected into a light trap. Trapping light lowers the efficiency of such systems, and the trapped light is dissipated as heat.

SUMMARY

In described examples, a system (e.g., a projection system) can include a diffractive optical element adapted to be illuminated by at least one coherent light beam. A lens array is coupled to receive a diffracted beam of light from the diffractive optical element. The lens array includes a first and a second array lens. The first array lens is coupled to receive a first sector of a pattern of illumination of the diffracted beam of light, and the second array lens is coupled to receive a second sector of the pattern of illumination of the diffracted beam of light. A spatial light modulator is coupled to receive overlapping diffracted beams of light from the first and second array lenses to form an image beam.

DETAILED DESCRIPTION

Figure 1:
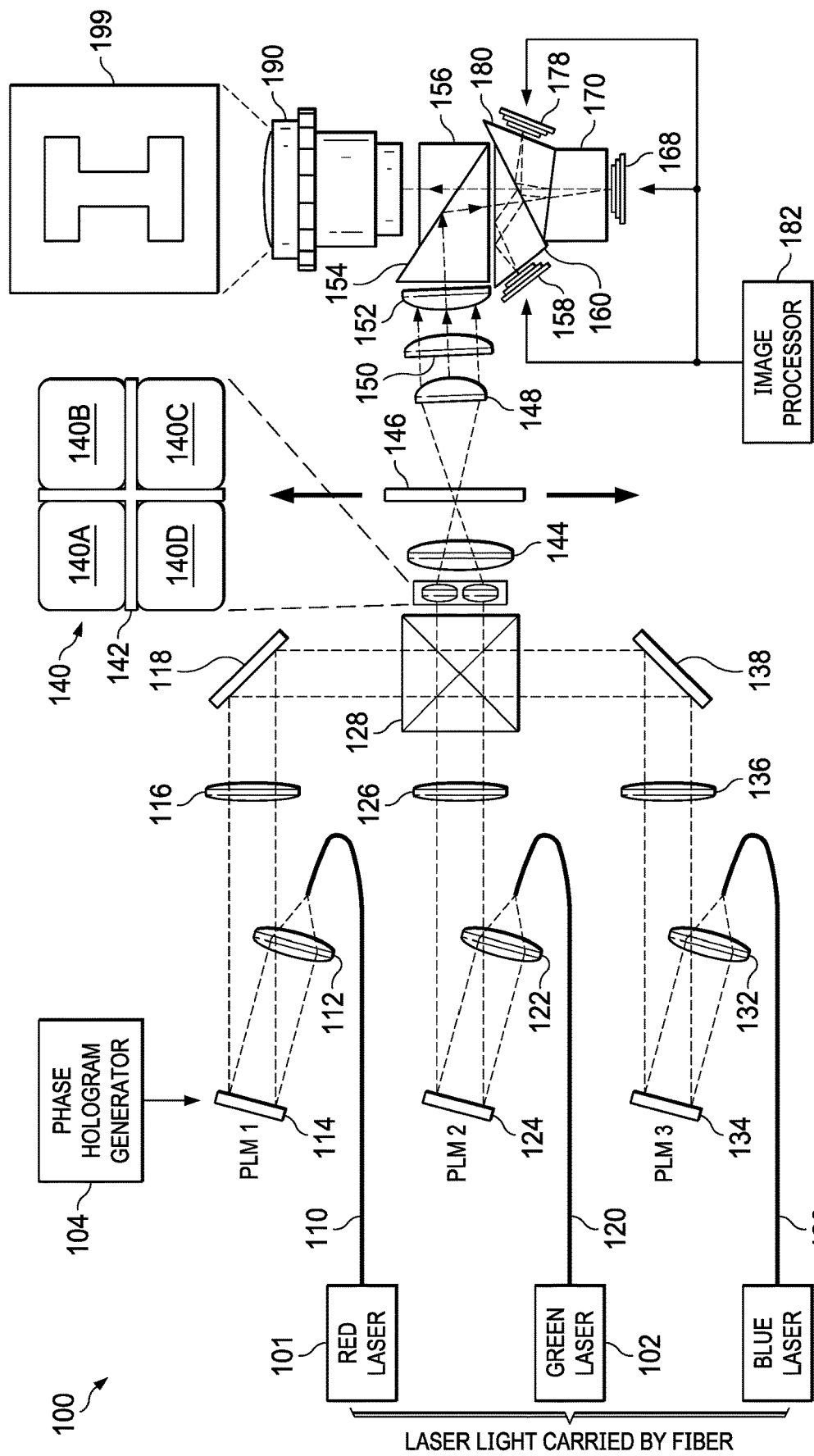
FIG. 1 is an orthographic view of an example illumination system.

In the drawings, like reference numerals refer to like elements, and the various features are not necessarily drawn to scale.

A phase hologram—e.g., generated by a phase spatial light modulator (PSLM or PLM)—can include a two-dimensional array of pixels. Each pixel (e.g., a mechanical element for modulating picture elements) of the PLM pixel array can vary the path length of an incident coherent light wavefront, so that the optical phase thereof can be controlled on a per pixel basis. In one example, a PLM array can include pixels, wherein each pixel includes a corresponding moveable micromirror, so that the micromirror can move in a direction perpendicular to a plane of the pixel array. The vertical motion of a micromirror can be on the order of half of a wavelength of the incident coherent light, so that the reflected wavefront can be shifted on the order of a full wavelength.

Some PLMs can be used to create distributions (e.g., spatial distributions) of arbitrary intensities across a projected image, where the light modulated for the projected image has been propagated from the PLM to an SLM and then to a far field for display. Some PLMs can also be used to scan a beam of laser light to an arbitrary position and/or used to create an arbitrary image. Scanning a beam of laser light can be used to efficiently direct light in a direction for illuminating an image.

Some applications for PLMs include illuminating high-dynamic-range (HDR) image displays. In such applications, a PLM can be configured to receive coherent light and to selectively reflect the incident coherent light toward a DMD or liquid crystal (LC), so that light is more directed to illuminate areas of a projected image that are bright, and that light is less directed to towards dark areas of the projected image.

Figure 2:
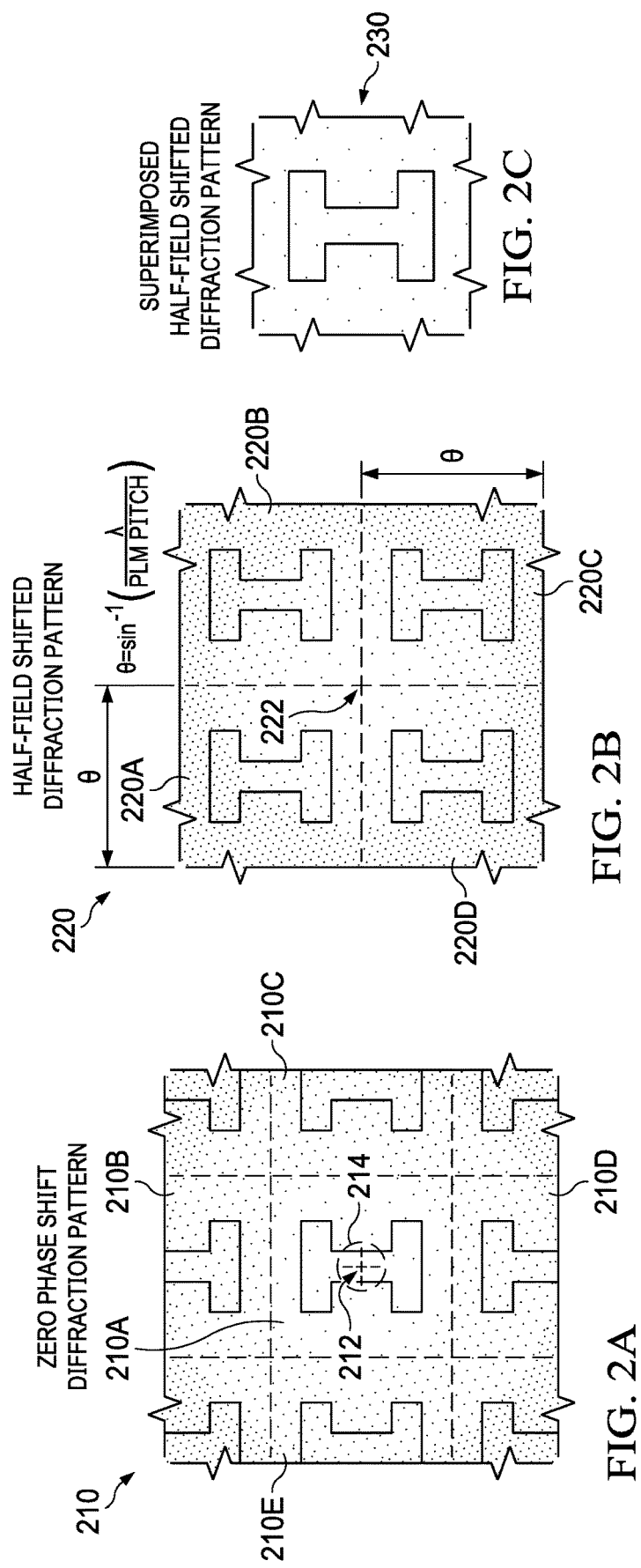
FIG. 2A shows a representation of an example diffraction image (e.g., a zero-phase shift diffraction pattern) that includes visible diffraction order effects generated by the example illumination system of FIG. 1.
FIG. 2B shows a representation of an example diffraction image (e.g., a half-field shifted diffraction pattern) including reduced zero-order effects generated by the example illumination system of FIG. 1.
FIG. 2C shows a representation of an example diffraction image (e.g., a superimposed half-field shifted diffraction pattern) generated by superimposed holographically half-field shifted composite diffracted beams of light generated by the example illumination system of FIG. 1.

In one example, a zero-order beam (e.g., a zero-order beam intensity) appears in the center of a far-field image that has been generated by illuminating an SLM with coherent light modulated by a PLM (e.g., as shown in FIG. 2A). The zero-order diffraction beam illumination pattern is a result of some non-ideal properties of the PLM and displayed hologram data which can result in unwanted light in the image area. Zero-order effects are visible in a central portion of the far-field image, in which some of the zero-order effects include "over-illuminated" portions of the far-field. Such zero-order effects can reduce the projected picture's fidelity to the original image to be displayed. Moreover, the uniformity of pixel illumination in the far-field image is determined by the Fourier transform of the active surface of each pixel and/or mirror of the PLM, so that (for example) a maximum brightness occurs near the zero-order phase location (e.g., as a function of wavelength) and falls off in accordance with a $\sin(x/x)$-type envelope (e.g., for ideally flat, square PLM pixels). Such zero-order effects and the illumination-intensity falloff of the $\sin(x/x)$ envelope contribute to form an uneven illumination gradient that can degrade the uniformity of pixel illumination, so that high-quality images can be more difficult to project.

In example techniques described herein, a far-field image is generated by illuminating an (e.g., amplitude-only) SLM with hologram-induced, phase-shifted coherent light received from a PLM. By applying a 2D linear phase ramp—such as $\exp(2\pi j(xm+yn))$—to the phase-only hologram, the far-field image can be shifted, so that the zero-order effects are at a corner of an image (e.g., instead of the center: see, FIG. 2B, which is described hereinbelow). The resulting diffraction image includes four sector (e.g., quadrant) images, where each quadrant image includes a shifted version of the zero-order image. The areas around the four adjacent (e.g., mutually contiguous) corners of the quadrant images are more brightly illuminated, and the opposing corner of each respective quadrant image is less brightly illuminated.

The hologram-induced shifted coherent light is spatially segregated into four beam sectors (e.g., quadrants) in which each beam sector includes light for illuminating a respective image quadrant. A lens array (e.g., a two-by-two lens array) includes array lenses, wherein the array lenses are arranged in a plane, so that each array lens can receive a mutually different quadrant of the beam sectors. A mask (e.g., optical mask adjacent to the lens array) can optionally be configured to mask (e.g., block) block a portion of a zero-order phase image to reduce zero-order effects that might otherwise be visible in a far-field shifted image.

The lens array is configured to combine (e.g., superimpose) light of each of the four beam quadrants to form a combined phase hologram for illuminating the SLM. When the combined phase hologram illuminates the SLM, the most brightly illuminated corner (for example) of each quadrant is superimposed over (e.g., optically averaged with) the least brightly illuminated corner (e.g., the respective, diagonally opposite corner) of each quadrant. The superimposing of the four beam quadrants generates a uniformly illuminated far-field image, which is suitable for projection of HDR images (for example).

FIG. 1 is an orthographic view of an example illumination system. The illumination system 100 generally includes elements such as light sources 101 (e.g., a red laser), 102 (e.g., a green laser) and 103 (e.g., a blue laser), fiber optics 110, 120 and 130 (for respectively carrying coherent light of respective wavelengths), source lenses 112, 122 and 132, PLMs 114, 124 and 134, hologram output lenses 116, 126 and 136, prism 128 (e.g., color-combining prism), and mirrors 118 and 138, lens array 140, mask 142 (optional), inverting lens 144, diffuser 146, relay imaging lenses 148, 150 and 152, prisms 154, 156, 160, 170 and 180, DMDs 158, 168 and 178 and projection focusing element 190. A phase hologram generator (e.g., hologram generator 104) is configured to program a PLM (e.g., 114, 124 or 134) to generate a phase hologram, and an image processor 182 (which can be also include the hologram generator 104) can program an SLM to generate a selected image for projection as a portion (all or some of) far-field image 199.

The light sources 101, 102 and 103 can include mutually independently controllable lasers such as laser diodes. Light from a first light source (e.g., light source 101) is optically coupled to a first diffractive optical element (e.g., PLM 114) via fiber optics 110 and source lens 112. Light from a second light source (e.g., light source 102) is coupled to a diffractive optical element PLM (e.g., PLM 124) via fiber optics 120 and source lens 122. Light from a third light source (e.g., light source 103) is coupled to a third diffractive optical element (e.g., PLM 134) via fiber optics 130 and source lens 132.

A coherent light beam illuminator includes at least one of a light source (e.g., a coherent light source such as a laser), fiber optics, and a source lens, where a diffractive optical element is adapted to be optically coupled to a (e.g., a respective) coherent light beam illuminator. In an example, a first coherent light beam illuminator can include a first light source configured to generate a first incident coherent light beam, and a second coherent light beam illuminator can include a second light source configured to generate a second incident coherent light beam, wherein the first and second coherent light beam illuminators are optically coupled to the lens array.

The light sources 101, 102 and 103 can be formed in separate substrates or the same substrate. The various light-emitting portions of the light sources 101, 102 and 103 can be individually and selectively controlled in various examples. The light sources 101, 102 and 103 can be tuned to generate respective coherent light beams having wavelengths of primary colors (e.g., for generating white light in controlled combination), and some applications can include light sources of mutually different colors and/or color temperatures for additive (or subtractive) color synthesis in varying applications. While three light sources are described, various examples can include more or less numbers of light sources and include differing respective color gamuts. (Various example light sources can include a light source for emitting wavelengths of non-visible light.)

Coherent light optically coupled (e.g., received) from respective fiber optics is focused by respective source lenses upon an active surface of a respective PLM. A source lens can be configured to direct light at an angle (e.g., selected from a range of 20 through 30 degrees from perpendicular) onto the active surface of a respective PLM. For example: the source lens 112 is configured to focus light coupled by fiber optics 110 onto the active surface of the PLM 114; the source lens 122 is configured to focus light coupled by fiber optics 120 onto the active surface of the PLM 124; and the source lens 132 is configured to focus light coupled by fiber optics 130 onto the active surface of the PLM 134. In various examples, a PLM can be a diffractive optical element that is configured to generate a diffracted beam of light responsive to an incident coherent light beam, wherein the diffracted beam of light includes a diffracted pattern of illumination (e.g., see, FIG. 2b for an example representation of a diffracted pattern of illumination). The diffracted pattern of illumination includes diffracted light of spatially varying intensities in at least one cross-sectional plane at right-angles to an axis of projection of the diffracted pattern of illumination.

The PLMs are configured to generate a respective hologram (e.g., a respective phase hologram) for phase shifting a received wavefront of coherent light (e.g., where the received wavefront has a same, selected frequency and phase of light received from a respective source lens). The respective holograms can have a range of view of 5 through 10 degrees. For example: a PLM 114 is coupled to generate a first hologram for phase shifting coherent light generated by the light source 101; a PLM 124 is coupled to generate a second hologram for phase shifting coherent light generated by the light source 102 and a PLM 134 is coupled to generate a third hologram for phase shifting coherent light generated by the light source 103. Each PLM can be programmed (e.g., by the hologram generator 104) with a phase hologram to generate contours of an active surface of a respective PLM, so that the active surface is configured to selectively diffract incident coherent light. The hologram generator can determine the phase hologram in response to a wavelength of the coherent light beam optically coupled to a respective PLM.

As described hereinbelow with reference to FIG. 3, an active surface of an example PLM includes an array of micromirrors (e.g., which can be actuated by independently controllable pistons). The PLM can be programmed (by generating a physical surface for diffracting received light) to phase shift (e.g., selectively phase shift) a received wavefront. The received wavefronts are phase shifted by a selected fraction of a wavelength of the received coherent light, so that the distance of mirror travel to generate the phase-shift (e.g., assuming a common speed of propagation of light) is determinable in response to the wavelength of the received wavefront. The wavefronts can be phase shifted by one wavelength by a respective PLM by actuating selected pistons of the PLM to move a respective micromirror by a distance that is one-half of a wavelength of the coherent light (e.g., a movement of a micromirror affects the phase shift by a factor of two because of the two-way path of the reflected light through the same "delta" in distance traversed by a micromirror from a zero-phase shift position).

The diffracted beams of light generated by the PLMs 114, 124 and 134 are respectively focused by hologram output lenses 116, 126 and 136 and optically coupled by at least one of the mirrors 118 and 138 (e.g., color-combining mirrors) and prism 128 (e.g., color-combining mirrors/prism) to the lens array 140. The lens array 140 is a two-by-two lens array that includes array lenses 140A (e.g., top-left quadrant lens), 140B (e.g., top-right quadrant lens), 140C bottom-right quadrant lens) and 140D (e.g., bottom-left quadrant lens).

The array lenses 140A, 140B, 140C and 140D are respectively optically coupled to receive a respective sector (e.g., quadrant) of each of the diffracted beams of light generated by a respective one of the PLMs 114, 124 and 134 (e.g., responsive to coherent illumination of at least one of PLMs 114, 124 and 134). For example: the array lens 140A (e.g., top-left quadrant lens) is configured to receive a top-left portion of the respective diffracted beams of light (e.g., a first beam quadrant) generated by the PLMs 114, 124 and 134; the array lens 140B (e.g., top-right quadrant lens) is configured to receive a top-right portion of the respective diffracted beams of light (e.g., a second beam quadrant) generated by the PLMs 114, 124 and 134; the array lens 140C (e.g., bottom-right quadrant lens) is configured to receive a bottom-right portion of the respective diffracted beams of light (e.g., a third beam quadrant) generated by the PLMs 114, 124 and 134; and the array lens 140D (e.g., bottom-left quadrant lens) is configured to receive a bottom-left portion of the respective diffracted beams of light (e.g., a fourth beam quadrant) generated by the PLMs 114, 124 and 134. In other example cases in which more (or less) PLMs are used, the array lenses of the lens array 140 each receive a respective sector of a diffracted beam of light beam received from each optically coupled PLM.

In at least one example system, the lens array 140 is illuminated by a diffracted beam of light from the diffractive optical element (e.g., 114). The lens array 140 includes a first array lens (e.g., 140A) that is illuminated by a first sector of a pattern of illumination of the diffracted beam of light. The lens array further includes a second array lens (e.g., 140C) that is illuminated by a second sector of the pattern of illumination of the diffracted beam of light. The second sector of the pattern of illumination of the diffracted beam of light includes a distribution of light intensities that is different from a distribution of light intensities of the first sector of the pattern of illumination of the diffracted beam of light.

In at least one example system, a lens array (e.g., 140) is optically coupled to the diffractive optical element, the lens array including a first array lens (e.g., 140A) configured to receive a first sector of the diffracted pattern of illumination, and wherein the lens array includes a second array lens (e.g., 140C) configured to receive a second sector of the diffracted pattern of illumination, the first array lens and second array lens configured to generate overlapping diffracted beams (e.g., as a composite diffracted beam of light) responsive to the diffracted pattern of illumination. The at least one example system can further include a third array lens configured to receive a third sector of the diffracted pattern of illumination and a fourth array lens configured to receive a fourth sector of the diffracted pattern of illumination.

The array lenses 140A, 140B, 140C and 140D are respectively configured to superimpose (e.g., overlap) each of the received respective sectors (e.g., quadrants) of the diffracted beams of light, so that a composite diffracted beam of light is generated. For example: the array lens 140A is configured to focus the first beam sector onto a common area (e.g., a same portion of the inverting lens 144); the array lens 140B is configured to focus the second beam sector onto the common area; the array lens 140C is configured to focus the third beam sector onto the common area; and the array lens 140D is configured to focus the fourth beam sector onto the common area. The inverting lens 144 is configured to generate an inverted, composite diffracted beam of light, which is optically coupled to at least one spatial light modulator.

In an example, each array lens of a lens array is optically coupled to (e.g., wherein each array lens is configured to focus a respective diffracted beam of light onto a common area of) an inverting lens, so that the inverting lens is optically coupled to the lens array. The lens array is configured to focus the first and second sectors of the diffracted pattern of illumination upon a same portion of the inverting lens (e.g., where the same portion can be the area of intersection of the focused first and second sectors of the diffracted pattern of illumination). A spatial light modulator (such as one of the DMDs 158, 168 and 178 for final imaging) is optically coupled to the lens array (e.g., lens array 140, via the inverting lens), the spatial light modulator configured to form an image beam responsive to the overlapping diffracted beams.

The composite diffracted beam of light is optically coupled to (e.g., directed towards) the inverting lens 144. The inverting lens 144 is a combining lens that is configured to combine with the lens array to generate the diffracted beam of light, so that the composite diffracted beam of light converges according to a focal length and/or a focal point of the inverting lens 144.

The lens array 140 optionally includes a mask 142. The mask 142 is arranged between adjacent array lenses to mask (e.g., to cover or to occult) areas bordering adjacent quadrant lenses. For example, the masked areas can include areas between each adjacent pair of quadrant lenses and can include the central border area (e.g., "four corners" area). The central border area includes a central axis (e.g., an intersection of a central axis of projection and a plane that includes all array lenses of the lens array 140), which is located between the central corners of the first, second, third and fourth array lenses (array lenses 140A, 140B, 140C and 140D). The mask 142 is configured to mask the central border area (e.g., see, central axis 222) and is configured to block propagation of zero-order effects and higher diffraction order effects that might otherwise be visible (e.g., be displayed) when a far-field image is generated in response to unmasked diffracted beams of light.

Responsive to the mask 142 being located (e.g., disposed) between (e.g., adjacent to and/or superjacent to) the adjacent lenses of the first, second, third and fourth array lenses, each of the sectors of each respective received diffracted beam of light are mutually distinct sectors with respect to other sectors in the respective received diffracted beam of light (e.g., so that the beam sectors do not overlap when initially illuminating respective array lenses). The mask 142 is can be optionally included to block a portion of a zero-order phase image of the diffracted pattern of illumination of the diffracted beam of light (e.g., optically coupled from a respective diffractive optical element: see, for example, FIG. 2A and FIG. 2B). Adjacent lenses (e.g., between which respective portions of the mask are disposed) of the lens array can include: the first array lens being adjacent to the second array lens and the fourth array lens; the second array lens being adjacent to the first array lens and the third array lens; the third array lens being adjacent to the second array lens and the fourth array lens; and the fourth array lens being adjacent to the third array lens and the first array lens.

A diffuser 146 is an optional diffuser arranged having a moveable aperture optically coupled to (e.g., in the path of) the composite diffracted beam of light (e.g., at the focal point of the inverting lens 144). The aperture is configured to move (e.g., fluctuate in location) and to diffuse the received composite diffracted beam of light, which reduces laser "speckle." Because the diffuser is located at a far-field image plane, the diffuser need not adversely blur the image generated at the imaging SLM. Laser speckle is visible (and degrades the quality of an image) when an imaged laser beam is reflected from a display surface that has surface features that are larger than a wavelength of light from the laser. The diffuser 146 generates a reduced-speckle composite diffracted beam of light in response to receiving the composite diffracted beam of light from the inverting lens 144.

The composite diffracted beam of light (e.g., reduced-speckle composite diffracted beam of light) is optically coupled to the relay imaging lenses 148, 150 and 152. The relay imaging lenses 148, 150 and 152 are configured to reimage the PLM image onto a respective final imaging DMD (e.g., one of 158, 168 and 178).

The relay imaging lenses 148, 150 and 152 are optically coupled via prism 154 to the prisms 156, 160, 170 and 180. The prisms 156, 160, 170 and 180 include (for example) dichroic mirror surfaces, so that selected colors (e.g., each respective color of light sources 101, 102 and 103) can be selectively (e.g., separately) optically coupled to a respective DMD 158, 168 and 178. Each of the respective DMDs is optically coupled to receive overlapping diffracted beams of light from at least two array lenses to form an image beam. The image beams can be combined (e.g., if more than one image beam is present) to form an image beam (e.g., a combined image beam) that is optically coupled to a projection focusing element 190.

For example, the prism 160 is configured to direct a diffracted beam of light (e.g., generated by PLM 114 in response to illumination by a red laser) toward the DMD 158, which images a first color holographically illuminated image frame of an image to be displayed in the far-field. The prism 170 is configured to direct a diffracted beam of light (e.g., generated by PLM 124 in response to illumination by a green laser) toward the DMD 158, which images a second color holographically illuminated image frame of an image to be displayed in the far-field. The prism 180 is configured to direct a diffracted beam of light (e.g., generated by PLM 134 in response to illumination by a blue laser) toward the DMD 158, which images a third color holographically illuminated image frame of an image to be displayed in the far-field.

The DMDs 158, 168 and 178 can respectively include a two-dimensional array of reflective elements (e.g., micromirrors) arranged in rows and columns, where each such reflective element controls an illumination with respect to a "pixel" (e.g., a micromirror for individually controlling a respective portion of an incident light beam for projection). The reflective elements of the 158, 168 and 178 are individually responsive to input data received from an image processor 182. In an example, the input data includes bit frames generated in response to pixel hue and intensity information data of an image frame of an image input signal. The bit frames can be projected using a pulse-width modulation. Pulse-width modulation schemes include weighted time intervals for projection of pixels of pixel hue and intensity corresponding to respective pixels in the input data. The weighted time intervals are sufficiently long to permit human eye integration over a given image frame display period.

The prisms 156, 160, 170 and 180 are optically coupled to receive and superimpose the first, second and third color holographically illuminated image frames from the respective DMDs, and to optically merge the holographically illuminated image frames (e.g., that are superimposed when a color image is being generated by at least two DMDs) to the projection focusing element 190.

The projection focusing element 190 is optically configured to relay the image beam from the spatial light modulator and to focus the image beam for view. In an example, the projection focusing element 190 is optically coupled to the spatial light modulator (e.g., DMD 168), and the projection focusing element 190 is configured to focus the image beam for view (e.g., for projection on a display screen for viewing by a human observer). The projection focusing element 190 is configured to project the holographically illuminated image frame(s) upon a display surface, so that the holographically illuminated image frame is displayed as a displayed image (e.g., far-field image 199). The holographically illuminated image frame includes, for example, an increase in resolution and contrast over images projected (e.g., from an equivalent DMD) using noncoherent light.

FIG. 2A shows a representation of an example diffraction image (e.g., a zero-phase shift diffraction pattern) that includes visible diffraction order effects generated by the example illumination system of FIG. 1. For example, the diffraction image 210 includes a field 210A (which includes zero-order effects), and fields 210B, 210C, 210D and 210E (which include higher order integer diffraction effects). Diffraction images can be generated by directing coherent light on an active surface of a PLM (for example) to generate a holographically diffracted beam of light that includes a distribution of light intensities. The diffracted beam of light is optically coupled to illuminate a DMD imager that has been programmed (for example) to generate an image of a capital "I." The diffraction image 210 is representation of a far-field image displayed by directing light from the DMD imager to a display screen (e.g., where the directed light is generated without the lens array 140 described herein).

The image of the capital "I" (e.g., as illuminated by a Fraunhofer/Fourier hologram-induced diffracted beam of light) is displayed as a zero-order diffraction image in the field 210A, while higher-order (e.g., whole-number ordered) diffraction images of the capital "I" exist in infinite (theoretically infinite) series that extend vertically and horizontally (e.g., as partially shown in fields 210B, 210C, 210D and 210E). The intensity of the diffraction images decline (e.g., as a function of the sin(x/x) envelope), so that intensities of the far-field zero-order diffraction images are reduced radially from a central axis 212 of the diffraction image 210. For example, illumination intensities of a central portion of the zero-order illumination effects are sufficiently bright (e.g., overexposed) to at least perceptibly lose displayed information, whereas illumination intensities of the fields 210B, 210C, 210D and 210E (and so on into infinity) decrease and become more imperceptible in directions extending outwards from the central axis.

FIG. 2B shows a representation of an example diffraction image (e.g., a half-field shifted diffraction pattern) including reduced zero-order effects generated by the example illumination system of FIG. 1. For example, the diffraction image 220 includes fields 220A, 220B, 220C and 220D. The fields 220A, 220B, 220C and 220D are vertically and horizontally shifted from the central axis by a half-field. The diffraction image 220 can be generated by directing coherent light on an active surface of a PLM programmed to generate a half-field shifted phase hologram. When illuminated by coherent light of a selected wavelength, the phase hologram creates a diffraction pattern having intensities shifted by a half-field vertically and horizontally. Due to non-ideal implementation of the hologram for half-field shifting a diffraction image, the zero-order effects are reduced (e.g., and not necessarily eliminated) and can be reduced further by use of an optional blocking mask (e.g., mask 142). The mask 142 can be arranged between adjacent array lenses of the lens array 140. The diffraction orders (and thus the replicated far-field PLM images) are approximately spaced by an angle θ:

$$\theta = \arcsin\left(\frac{\lambda}{PLM_{pitch}}\right) \quad (1)$$

where λ is the wavelength of the coherent light directed on the active surface (e.g., hologram) of the PLM, and $PIM_{pitch}$ is the pitch of the pistons (e.g., 5-10 microns) for generating the contours of the active surface of the PLM (described hereinbelow with reference to FIG. 3).

The phase hologram for half-field shifting an image generates a diffracted pattern of illumination. The diffracted pattern of illumination is directed upon a DMD imager that has been programmed (for example) to generate an image of a capital "I." The diffraction image 220 is a representation of a far-field image displayed by directing light from the DMD imager to a display screen (e.g., where the directed light is generated without the lens array 140 described herein).

The intensity of the diffraction images of the capital "I" decline (e.g., also as a function of the sin(x/x) envelope), so that so that intensities of the far-field zero-order diffraction images are reduced radially from a central axis 222 of the diffraction image 220. For example, illumination intensities are: brightest in the radially central corners of the fields 220A, 220B, 220C and 220D (e.g., respectively the bottom-right, bottom-left, top-left and top-right corners of each respective field); of intermediate brightness in radially intermediate corners of the fields 220A, 220B, 220C and 220D (e.g., respectively the bottom-left/top-right, top-left/bottom-right, top-right/bottom-left and bottom-right/top-left corners); and darkest in the radially distant corners of the fields 220A, 220B, 220C and 220D (e.g., respectively the top-left, top-right, bottom-right and bottom left corners). As described hereinbelow with respect to FIG. 2C, the fields 220A, 220B, 220C and 220D can be optically superimposed (e.g., effectively superimposed) to generate a superimposed field throughout which a uniform illumination gradient exists.

In an example, a phase hologram is configured to diffractively shift a Fourier-transform phase image (e.g., diffraction image 230) to a location between diffraction orders. The phase hologram can be configured to diffractively shift a Fourier-transform phase image vertically and horizontally to a location between diffraction orders of a Fourier series of phase images.

FIG. 2C shows a representation of an example diffraction image (e.g., a superimposed half-field shifted diffraction pattern) generated by superimposed holographically half-field shifted composite diffracted beams of light generated by the example illumination system of FIG. 1. For example, the diffraction image 230 is generated in response to a composite hologram (e.g., composite image hologram) that is generated by superimposing phase shifted beam quadrants generated by at least one hologram. The quadrants are phase shifted by a delta of a half-field.

The diffraction image 230 is representation of a far-field image displayed by directing the composite diffracted beam of light generated by the lens array 140 onto a DMD (e.g., programmed to image a capital "I"), and directing the composite hologram image as modulated by the DMD to a display screen.

The diffraction image 230 is generated by a uniform distribution of light intensities (e.g., by the composite hologram, which generates a uniform distribution of light intensities), so that the capital "I" is displayed with a uniform illumination, horizontally and vertically. The composite hologram effectively averages the nonuniform distribution of light intensities (e.g., that would have resulted without the use of the hologram combiner as illustrated in FIG. 2B) from corresponding portions (e.g., fields) of the half-field shifted hologram.

Figure 3:
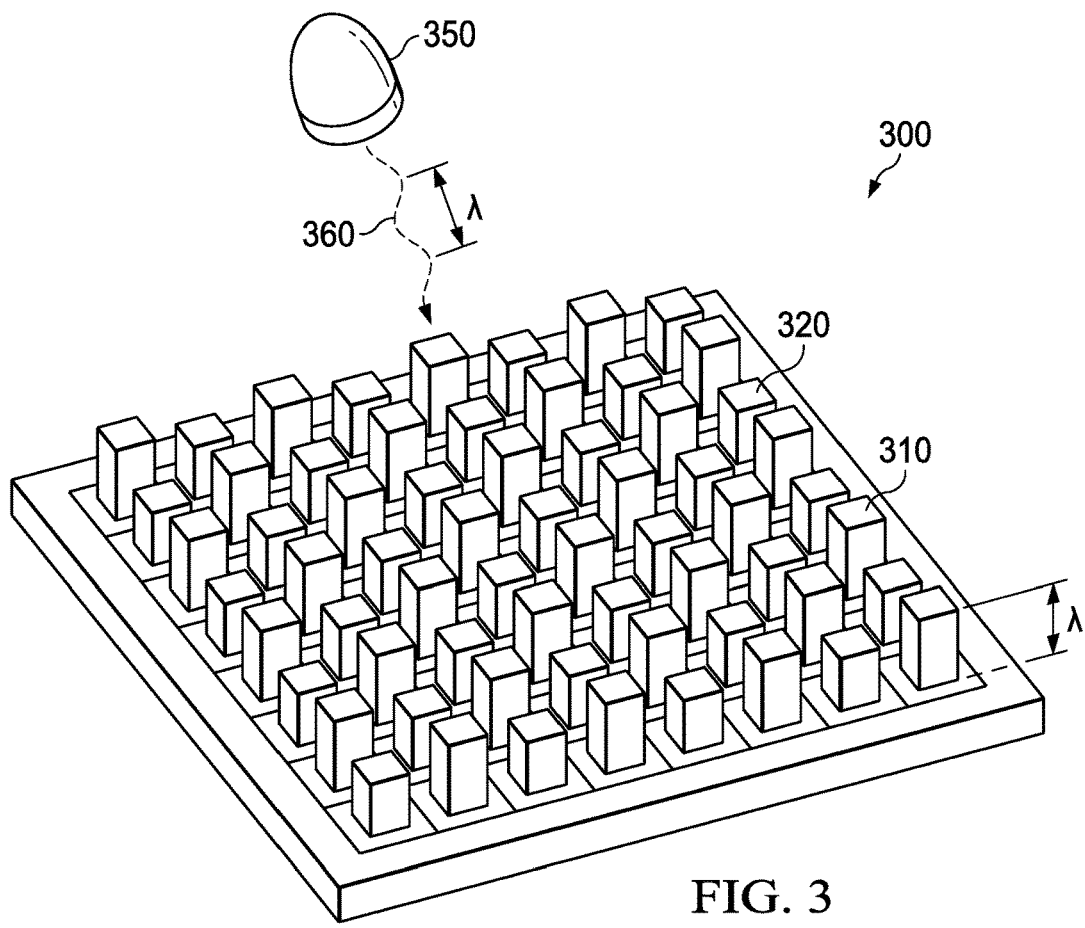
FIG. 3 is an orthographic view of an example phase light modulator.

FIG. 3 is an orthographic view of an example phase light modulator, such as PLM 300. The PLM 300 generally includes elements such as pistons 310 and 320. The displacement (e.g., amount of extension) of the pistons 310 and 320 are not-to-scale and are exaggerated, for example, for clarity. The extension of the pistons 310 and 320 is controlled by a PLM actuator (not shown) in response to information (e.g., programming) received from a phase hologram generator (e.g., hologram generator 104). The pistons 310 are shown fully extended to a distance 360 (e.g., height) demarcated as λ (lambda), while the pistons 320 are shown partially extended to a distance (e.g., height) that is a quarter wavelength shorter than the distance 360 (e.g., λ).

The visible portion (e.g., tops) of the pistons 310 and 320 are reflective (e.g., mirrored), so that the array of pistons forms an active surface of a PLM that is configured to generate (e.g., programmable to assume the contours of a selected phase hologram). In an example where coherent light (e.g., from a laser 350) is directed obliquely (e.g., at 20-30 degrees from perpendicular) on the active surface of the PLM 300, a phase hologram can be optically generated in response to a phase hologram by which the active surface of the PLM 300 is programmed. The generated phase hologram includes dimensional features determined in response to a wavelength of the incident coherent light beam. The dimensional features can be determined, for example, responsive to calculations executed by a phase hologram generator.

As described herein, the PLM 300 can be programmed (by generating a physical surface contoured to diffract received coherent light) to phase shift a received wavefront. The received wavefronts are phase shifted (for example) by a half wavelength of the received coherent light, so that the degree of mirror travel for generating a selected phase-shift (e.g., assuming a common speed of propagation of light) is determinable in response to the wavelength of the received wavefront. The wavefronts can be phase shifted by a wavelength by a respective PLM by actuating selected pistons of the PLM to move a respective micromirror by a distance that is one-half of a wavelength of the coherent light (e.g., a movement of a micromirror affects the phase shift by a factor of two because of the two-way path of the reflected light through the same "delta" in distance traversed by a micromirror from a zero-phase shift position).

Figure 4:
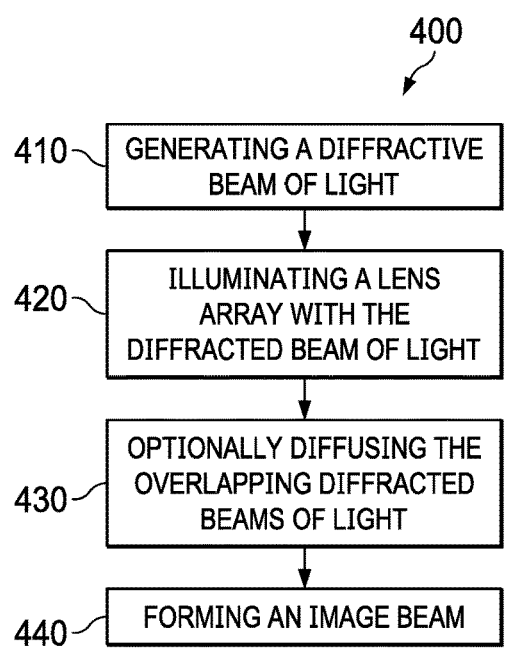
FIG. 4 is a flow diagram of an example method for homogenizing distributions of light intensities in a diffraction image.

FIG. 4 is a flow diagram of an example method for homogenizing distributions of light intensities in a diffraction image. The process 410 of the example method 400 includes generating, by a diffractive optical element, a diffracted beam of light by illuminating a diffractive optical element with at least one coherent light beam. For example, a diffracted beam of light can be generated by illuminating a diffractive optical element (e.g., 114) with at least one coherent light beam (e.g., optically coupled from light source 101 via fiber optics 110).

The process 420 includes illuminating a lens array, that includes a first and second array lens, with the diffracted beam of light coupled from the diffractive optical element. The illuminating the lens array with the diffracted beam of light can include: focusing, by a first array lens, a first sector of a pattern of illumination of the diffracted beam of light to generate a first sector focused pattern; and focusing, by a second array lens, a second sector of the pattern of illumination of the diffracted beam of light to generate a second sector focused pattern. For example, the lens array (e.g., 140) can include (at least) a first and second array lens (e.g., 140A and 140C). The lens array can be illuminated with the diffracted beam of light coupled from the diffractive optical element (e.g., 114). The first array lens is illuminated with a first sector of a pattern of illumination (see, for example, the pattern of illumination in 220A) of the diffracted beam of light, and the second array lens is illuminated with a second sector of the pattern of illumination (see, for example, the pattern of illumination in 220C) of the diffracted beam of light.

The process 430 optionally includes diffusing light from the first array lens and the second array lens. The diffusing light from the first array lens and the second array lens can include: diffusing, by a diffuser, light from the first array lens and the second array lens. For example, light from array lenses (e.g., 140A and 140C) are converged by a converging lens (e.g., 144) to illuminate a diffuser (e.g., 146). The diffuser can include at least one aperture. The diffuser can be moved during the illumination to reduce display surface-induced speckle of coherent light (e.g., of far-field image 199) that is projected for display (e.g., by projection focusing element 190).

The process 440 includes forming an image beam by illuminating a spatial light modulator with a first distribution of light intensities from the first array lens and with a second distribution of light intensities from the second array lens. The forming an image beam by illuminating a spatial light modulator with first and second distribution of light intensities can include: modulating, by a spatial light modulator, the first sector focused pattern and the second sector focused pattern, wherein a portion of the first sector focused pattern and a portion of the second sector focused pattern overlap on the spatial light modulator. For example, the image beam (e.g., for projection by the projection focusing element 190) by illuminating a spatial light modulator (e.g., 158) with a first distribution of light intensities from the first array lens (e.g., 140A) and with a second distribution of light intensities from the second array lens (e.g., 140C).

A portion (e.g., some or all the portion) of the first and second distributions of light intensities overlap during the illumination of the spatial light modulator. For example, a single pixel of the SLM can control both a stronger beam received from a first lens of the lens array (e.g., first array lens) and a weaker beam received from a second lens of the lens array (e.g., second array lens). The superimposing of the stronger and weaker beams effectively averages the strength of the two beams to a normalized value. (As described above with respect to FIG. 2, four beams are combined, which increases the homogeneity and brightness levels of the displayed image.) When applied across an active portion of the SLM (which includes pixels for forming a displayed image), the pixels of the displayed image are formed in response to incident light homogenized to the normalized value. Forming the pixels of the displayed image in response to incident light homogenized to the normalized value efficiently generates a displayed image of homogenous illumination (e.g., including a linearized contrast ratio in response to effectively averaging the coherent light), higher resolution (e.g., in response to the coherency of the coherent light), and higher brightness (e.g., in response to the generation and coherency of the coherent light).

Figure 5:
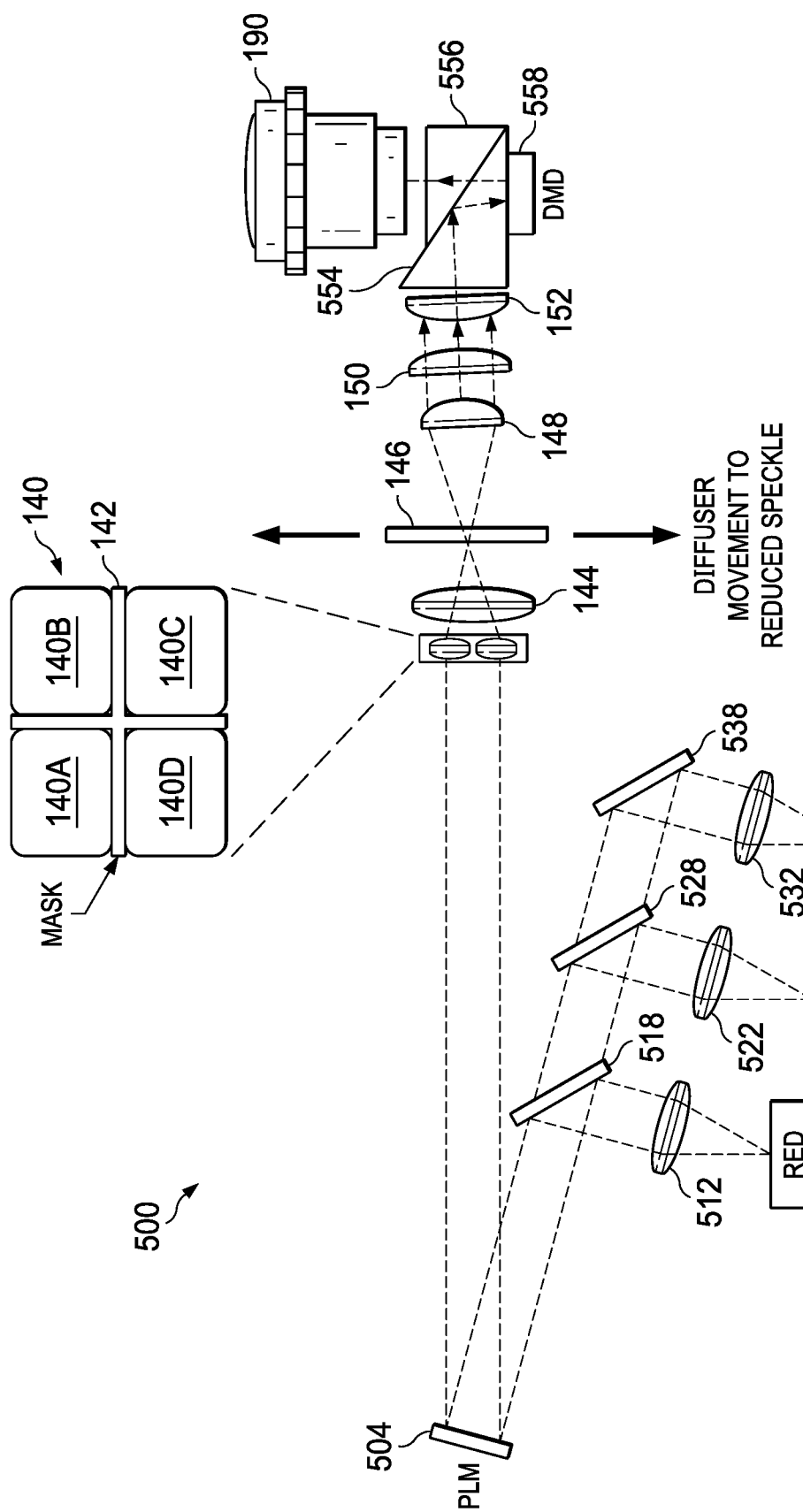
FIG. 5 is an orthographic view of an example time-multiplexed illumination system.

FIG. 5 is an orthographic view of an example time-multiplexed illumination system. The illumination system 500 generally includes elements such as light source 501 (e.g., a red laser), 502 (e.g., a green laser) and 503 (e.g., a blue laser), source lenses 512, 522 and 532, PLM 504, color-combining mirrors 518, 528 and 538, lens array 140, mask 142 (optional), inverting lens 144, diffuser 146, relay imaging lenses 148, 150 and 152, prism 554 and 556, DMD 558 and projection focusing element 190.

The light sources 501, 502 and 503 can be mutually independently controllable lasers such as laser diodes. Light from a first light source (e.g., light source 501) is optically coupled to the diffractive optical element (e.g., PLM 504) via source lens 512 and color-combining mirror 518 (which reflects light incident from source lens 512 and passes light incident from color-combining mirrors 528 and 538). Light from a second light source (e.g., light source 502) is coupled to the diffractive optical element (e.g., PLM 504) via source lens 522 and color-combining mirror 528 (which reflects light incident from 512 and passes light incident from color-combining mirror 538). Light from a third light source (e.g., light source 503) is coupled to the diffractive optical element (e.g., PLM 504) via source lens 532 and color-combining mirror 528 (which reflects light incident from source lens 532).

The light sources 501, 502 and 503 are configured to be time-multiplexed (e.g., where the light sources are separately activated in a temporal sequence that can be repeated) to illuminate the lens array at different times. For example, the light sources 501, 502 and 503 are respectively time-multiplexed (e.g., pulsed on at mutually exclusive times) during a respective time of three times in a time-multiplexing period. During a first time: the light source 501 is energized (e.g., to emit coherent radiation); the PLM 504 is programmed to generate a first hologram for diffracting light of a first wavelength (e.g., red colored) from the light source 501; and the DMD is programmed to image a first color frame (e.g., red frame) for imaging a far-field image (e.g., far-field image 199). During a second time: the light source 502 is energized (e.g., to emit coherent radiation); the PLM 504 is programmed to generate a second hologram for diffracting light of a second wavelength (e.g., green colored) from the light source 502; and the DMD is programmed to image a second color frame (e.g., green frame) for imaging a far-field image. During a third time: the light source 503 is energized (e.g., to emit coherent radiation); the PLM 504 is programmed to generate a third hologram for diffracting light of a third wavelength (e.g., blue colored) from the light source 503; and the DMD is programmed to image a third color frame (e.g., blue frame) for imaging a far-field image.

The human eye, for example, optically integrates the first, second and third color frame-generated far-field images, so that a full-color image can be perceived by the human viewer. Moving images can be perceived when the time-multiplexing period is iterated (and a progression of frame information of a video sequence is sequentially applied during each iteration of the time-multiplexing periods).

The diffracted beams (e.g., time-multiplexed, diffracted beams) of light generated by the PLM 504 are optically coupled to the lens array 140. The lens array 140 is a two-by-two lens array that includes array lenses 140A (e.g., top-left quadrant lens), 140B (e.g., top-right quadrant lens), 140C bottom-right quadrant lens) and 140D (e.g., bottom-left quadrant lens).

In an example, the lens array 140 is optically coupled to receive each of the diffracted beams (e.g., having different wavelengths at separate times), wherein each of the different wavelength diffracted beams is corrected for magnification before being received by the lens array 140. For example, the source lens 512 can adjust the magnification of a red diffracted beam, the source lens 522 can adjust the magnification of a green diffracted beam and the source lens 532 can adjust the magnification of a blue diffracted beam.

The array lenses 140A, 140B, 140C and 140D are respectively optically coupled to receive a respective sector (e.g., quadrant) of each of the time-multiplexed, diffracted beams of light generated by the PLM 504. For example: the array lens 140A (e.g., top-left quadrant lens) is configured to receive a top-left portion of the time-multiplexed, diffracted beams of light (e.g., a first beam quadrant) generated by the PLM 504; the array lens 140B (e.g., top-right quadrant lens) is configured to receive a top-right portion of the time-multiplexed, diffracted beams of light (e.g., a second beam quadrant) generated by the PLM 504; the array lens 140C (e.g., bottom-right quadrant lens) is configured to receive a bottom-right portion of the time-multiplexed, diffracted beams of light (e.g., a third beam quadrant) generated by the PLM 504; and the array lens 140D (e.g., bottom-left quadrant lens) is configured to receive a bottom-left portion of the time-multiplexed, diffracted beams of light (e.g., a fourth beam quadrant) generated by the PLM 504.

In at least one example system, the lens array 140 is illuminated by a diffracted beam of light from the diffractive optical element (e.g., 514, which can be programmed by a hologram generator 104). The lens array 140 includes a first array lens (e.g., 140A) that is illuminated by a first sector of a pattern of illumination of the diffracted beam of light. The lens array further includes a second array lens (e.g., 140C) that is illuminated by a second sector of the pattern of illumination of the diffracted beam of light. The second sector of the pattern of illumination of the diffracted beam of light includes a distribution of light intensities that is different from a distribution of light intensities of the first sector of the pattern of illumination of the diffracted beam of light.

The array lenses 140A, 140B, 140C and 140D are respectively configured to superimpose (e.g., overlap) each of the received respective sectors (e.g., quadrants) of the diffracted beams of light, so that a composite diffracted beam of light is generated. For example: the array lens 140A is configured to focus the first beam sector onto a common area (e.g., a same portion of the inverting lens 144); the array lens 140B is configured to focus the second beam sector onto the common area; the array lens 140C is configured to focus the third beam sector onto the common area; and the array lens 140D is configured to focus the fourth beam sector onto the common area. The inverting lens 144 optically couples the time-multiplexed, composite diffracted beam of light to at least one spatial light modulator.

The time-multiplexed, composite diffracted beam of light is optically coupled to (e.g., directed towards) the inverting lens 144. The inverting lens 144 is configured to invert the time-multiplexed, composite diffracted beam of light, so that the time-multiplexed, composite diffracted beam of light converges according to a focal length and/or a focal point.

A diffuser 146 is optionally arranged having a moveable aperture optically coupled to the composite diffracted beam of light (e.g., at the focal point of the inverting lens 144). The aperture is configured to move and to diffuse the received composite diffracted beam of light, which reduces laser "speckle." The diffuser 146 generates a reduced-speckle, time-multiplexed and composite diffracted beam of light in response to receiving the composite diffracted beam of light from the inverting lens 144.

The time-multiplexed, composite diffracted beam of light (e.g., reduced-speckle, time-multiplexed and composite diffracted beam of light) is optically coupled to the relay imaging lenses 148, 150 and 152. The relay imaging lenses 148, 150 and 152 focus the diverging wavefront of the time-multiplexed, composite diffracted beam of light into focused rays (e.g., that include the time-multiplexed, composite diffracted beam of light).

The focused rays are optically coupled to the DMD 558 via prism 554. The DMD 558 is optically coupled to receive overlapping diffracted beams of light from at least two array lenses to form an image beam (e.g., into which three primary color image frames are time-multiplexed). The image beam is optically coupled to a projection focusing element 190.

An example system described herein includes a diffractive optical element adapted to receive at least one coherent light beam and to generate a diffracted pattern of illumination responsive to the at least one coherent light beam; a lens array optically coupled to the diffractive optical element, the lens array including a first array lens and a second array lens, the first array lens configured to focus a first sector of the diffracted pattern of illumination, the second array lens configured to focus a second sector of the diffracted pattern of illumination, and the second sector of the diffracted pattern of illumination including a distribution of light intensities different from a distribution of light intensities of the first sector of the diffracted pattern of illumination, the lens array configured to generate overlapping diffracted beams of light; and a spatial light modulator optically coupled to the lens array, the spatial light modulator configured to form an image beam responsive to the overlapping diffracted beams of light.

An example method described herein includes generating, by a diffractive optical element, a diffracted beam of light responsive to at least one coherent light beam incident on the diffractive optical element; focusing, by a first array lens optically coupled to the diffractive optical element, a first sector of a pattern of illumination of the diffracted beam of light to generate a first sector focused pattern; focusing, by a second array lens optically coupled to the diffractive optical element, a second sector of the pattern of illumination of the diffracted beam of light to generate a second sector focused pattern; and modulating, by a spatial light modulator optically coupled to the diffractive optical element, the first sector focused pattern and the second sector focused pattern, a portion of the first sector focused pattern and of the second sector focused pattern overlapping on the spatial light modulator.

The example method can further include: diffusing, by a diffuser optically coupled to the diffractive optical element, to generate diffused light responsive to light received from the first array lens and the second array lens; and projecting, by a projection focusing element optically coupled to the diffractive optical element, the diffused light.

Modifications are possible in the described embodiments, and other embodiments are possible, within the scope of the claims.

What is claimed is:

1. A system, comprising:
   a phase light modulator (PLM) comprising a two-dimensional array of pixels, the PLM adapted to be optically coupled to a coherent light beam illuminator, the PLM configured to generate a diffracted pattern comprising a first diffracted beam of light and a second diffractive beam of light responsive to an incident coherent light beam received from the coherent light beam illuminator;
   a lens array optically coupled to the PLM, the lens array comprising:
      a first array lens configured to receive the first diffracted beam of light and to produce a first overlapping diffracted beam of light responsive to the first diffracted beam of light;
      a second array lens configured to receive the second diffracted beam of light and to produce a second overlapping diffracted beam of light responsive to the second diffracted beam of light; and
   a spatial light modulator optically coupled to the lens array, the spatial light modulator configured to form an image beam responsive to the first overlapping diffracted beam of light and the second overlapping diffracted beam of light.

2. The system of claim 1, further comprising a projection focusing element optically coupled to the spatial light modulator, the projection focusing element configured to focus the image beam.

3. The system of claim 1, further comprising the coherent light beam illuminator, the coherent light beam illuminator including a light source configured to generate the incident coherent light beam.

4. The system of claim 3, wherein the coherent light beam illuminator is a first coherent light beam illuminator, the light source is a first light source and the incident coherent light beam is a first incident coherent light beam, the system further comprising a second coherent light beam illuminator, the second coherent light beam illuminator including a second light source configured to generate a second incident coherent light beam, the second coherent light beam illuminator optically coupled to the lens array.

5. The system of claim 4, wherein the first and second light sources are configured to be time-multiplexed to illuminate the lens array at different times.

6. The system of claim 4, wherein the PLM is a first PLM, the system further comprising a second PLM optically coupled to the second coherent light beam illuminator, the second PLM configured to generate a third diffracted beam of light and a fourth diffracted beam of light responsive to the second incident coherent light beam, the first array lens configured to receive the third diffracted beam of light, the second array lens configured to receive the fourth diffracted beam of light.

7. The system of claim 1, wherein the first diffracted beam of light and the second diffracted beam of light are in mutually distinct sectors.

8. The system of claim 1, wherein the PLM is configured to generate a phase hologram.

9. The system of claim 8, wherein the phase hologram includes dimensional features determined in response to a wavelength of the incident coherent light beam.

10. The system of claim 9, wherein the phase hologram is configured to diffractively shift a Fourier-transform phase image to a location between diffraction orders.

11. The system of claim 9, wherein the phase hologram is configured to diffractively shift a Fourier-transform phase image vertically and horizontally to a location between diffraction orders of a Fourier series of phase images.

12. The system of claim 1, further comprising an inverting lens, the inverting lens optically coupled to the lens array, the lens array configured to focus the first overlapping diffracted beam of light and the second overlapping diffracted beam of light upon a same portion of the inverting lens.

13. The system of claim 1, wherein the PLM is configured to produce a third diffracted beam of light and a fourth diffracted beam of light responsive to the incident coherent light beam, and wherein the lens array further includes a third array lens configured to receive the third diffracted beam of light, and wherein the lens array further includes a fourth array lens configured to receive the fourth diffracted beam of light.

14. The system of claim 13, wherein the first array lens, the second array lens, the third array lens and the fourth array lens are arranged as a two-by-two lens array.

15. The system of claim 13, further comprising a mask adjacent to the lens array, the mask arranged between adjacent array lenses of the first array lens, the second array lens, the third array lens and the fourth array lens, the first array lens adjacent to the second array lens and the fourth array lens, the second array lens adjacent to the first array lens and the third array lens, the third array lens adjacent to the second array lens and the fourth array lens, and the fourth array lens adjacent to the third array lens and the first array lens.

16. The system of claim 13, further comprising a mask adjacent to the lens array, the mask configured to block a portion of a zero-order phase image of the diffracted pattern of illumination.

17. The system of claim 1, further comprising the coherent light beam illuminator, the coherent light beam illuminator including a laser and fiber optics, the fiber optics coupled between the laser and the PLM.

18. The system of claim 1, further comprising a diffuser optically coupled to the lens array, the diffuser having a moveable aperture.

19. A method, comprising:
   generating, by a phase light modulator (PLM) comprising a two-dimensional array of pixels, a first diffracted beam of light and a second diffracted beam of light responsive to at least one coherent light beam incident on the PLM;
   focusing, by a first array lens optically coupled to the PLM, the first diffracted beam of light to generate a first overlapping diffracted beam of light;
   focusing, by a second array lens optically coupled to the PLM, the second diffracted beam of light to generate a second overlapping diffracted beam of light; and
   modulating, by a spatial light modulator optically coupled to the PLM, the first overlapping diffracted beam of light and the second overlapping diffracted beam of light.

20. The method of claim 19, further comprising:
   diffusing, by a diffuser optically coupled to the PLM, to generate diffused light responsive to light received from the first array lens and the second array lens; and projecting, by a projection focusing element optically coupled to the PLM, the diffused light.

\* \* \* \* \*